(12) United States Patent
Willinger

(10) Patent No.: US 6,330,956 B1
(45) Date of Patent: Dec. 18, 2001

(54) MOLDED PLASTIC PET BOWL

(75) Inventor: Jonathan Willinger, East Rutherford, NJ (US)

(73) Assignee: J.W. Pet Company, Hasbrouck Heights, NJ (US)

( * ) Notice: Subject to any disclaimer, the term of this patent is extended or adjusted under 35 U.S.C. 154(b) by 0 days.

(21) Appl. No.: 09/208,087

(22) Filed: Dec. 9, 1998

(51) Int. Cl.[7] ..................................................... B65D 1/48
(52) U.S. Cl. ........................ 220/574; 220/636; 220/626
(58) Field of Search ............................... 220/574, 574.1, 220/574.3, 575, 62.22, 62.13, 625, 626, 632, 636; 119/61

(56) References Cited

U.S. PATENT DOCUMENTS

| | | | |
|---|---|---|---|
| 2,905,351 | * | 9/1959 | Lerner . |
| 3,076,579 | * | 2/1963 | Kuhlman ............................ 220/574.3 |
| 3,195,510 | * | 7/1965 | Bernstein . |
| 3,578,524 | * | 5/1971 | Ingnell ................................ 220/62.22 |
| 3,653,362 | * | 4/1972 | Davis ........................................ 119/61 |
| 4,106,658 | * | 8/1978 | Brandon .................................. 220/453 |
| 5,366,103 | * | 11/1994 | Abernathy et al. ............... 220/23.83 |
| 5,419,454 | * | 5/1995 | Stowell et al. ......................... 220/574 |
| 5,485,937 | * | 1/1996 | Tseng .................................... 220/574 |
| 5,676,275 | * | 10/1997 | Khattar ................................. 220/575 |
| 5,743,210 | * | 4/1998 | Lampe ................................. 119/51.5 |
| 5,787,839 | * | 8/1998 | Magnant et al. ..................... 119/51.5 |
| 5,904,264 | * | 5/1999 | Yamada et al. ................... 220/62.18 |
| 5,979,361 | | 11/1999 | Willinger . |
| 6,145,474 | * | 11/2000 | Lemkin .................................. 119/61 |

* cited by examiner

Primary Examiner—Stephen Castellano
(74) Attorney, Agent, or Firm—Rosenman & Colin, LLP

(57) ABSTRACT

A molded plastic bowl is formed with a non-slip molded base. Venting is provided during molding of the base to the pre-formed bowl to allow molding gasses to escape the base molding cavity. Venting can be provided through the floor of the bowl, along its inside or outside upper surfaces or through an overhanging ledge formed in the bowl. Suction can also be applied to the molding cavity to remove molding gasses.

11 Claims, 9 Drawing Sheets

MOLDED PLASTIC PET BOWL

BACKGROUND OF THE INVENTION

1. Field of the Invention

The present invention relates in general to bowls having an upper bowl portion formed of one plastic material and a lower base portion formed of a second plastic material. This invention particularly relates to such bowls having a side wall or floor formed with bleed passages for the escape of gas generated as the base portion is molded to the bowl portion so as to define an annular boundary between the two different materials.

2. Description of Prior Developments

When molding a plastic bowl using a two-step molding process, it is difficult and costly to mold the bottom portion of the bowl with a diameter larger than the top portion so as to form a truncated-cone shaped profile. That is, when such a bowl is molded from different plastic or rubber materials on the upper and lower portions, an inwardly directed circumferential ledge is generally formed along the external annular boundary line between the two materials.

When building a mold which forms this annular circumferential boundary ledge, it was found that the walls of the upper portion of the bowl had to be virtually perfectly cylindrical rather than conical in order to extract the bowl from the mold. Otherwise, an expensive and complicated split mold was required.

Rather than using an expensive split mold, a two-part, two-material plastic bowl can be molded in the shape of an inverted truncated cone having an outwardly directed ledge defining the external boundary line between the two plastic materials. While this configuration simplifies the mold design, it creates a problem relating to the removal of gas from the mold during molding of the lower portion of the bowl to the upper pre-formed portion.

Accordingly, a need exists for a method and apparatus for molding a plastic pet bowl in the shape of an inverted truncated cone using a simple mold.

A further need exists for such a method and apparatus which effectively and inexpensively bleeds off excess gas during molding.

SUMMARY OF THE INVENTION

The present invention has been developed to fulfill the needs noted above and therefore has as an object the provision of a method and apparatus for efficiently and economically molding a pet bowl using one plastic material for its base and second plastic material for its top.

Another object of the invention is to provide a method and apparatus for molding a non-skid base on a plastic bowl having outwardly and upwardly diverging walls.

Still another object of the invention is the provision of a method and apparatus for molding a non-skid base on a plastic bowl so that molding gasses can be easily and economically vented.

Yet another object of the invention is the provision of a pet bowl having a plastic upper portion and a plastic or rubber non-skid base which has plastic or rubber extensions or runners decoratively arranged on the upper portions for venting gas during molding of the base to the upper portion.

These and other objects are met by the present invention which is directed to a method and apparatus for molding a non-skid base to a plastic bowl. The bowl can be formed with an upwardly and outwardly flaring sidewall in a profile similar to an inverted truncated cone. A circumferential ridge separates the base from the bowl along a molding boundary line. The bowl may be formed with bleed holes and/or bleed channels to allow molding gas to escape the mold cavity during molding of the base to the bowl.

In one embodiment of the invention, gas bleed holes can be formed in the floor of the bowl. This approach eliminates the need for forming an annular step, ledge or other discontinuity in the side wall of the bowl. In this case, the bowl and base can have rounded profiles which taper into one another along an external annular molding boundary line.

Molding of the base to the bowl can be carried out in the same mold in which the bowl is originally molded or in a separate mold. If separate molds are used, the bowl is removed from its original mold and placed in a second mold for receiving a base. The two molds can be included in one machine wherein the molding of the bowl is followed by the molding of the base in two separate steps.

The aforementioned objects, features and advantages of the invention will, in part, be pointed out with particularity, and will, in part, become obvious from the following more detailed description of the invention, taken in conjunction with the accompanying drawings, which form an integral part thereof.

BRIEF DESCRIPTION OF THE DRAWINGS

In the various figures of the drawings, like reference characters designate like parts.

DETAILED DESCRIPTION OF THE PREFERRED EMBODIMENTS

Figure 4A:
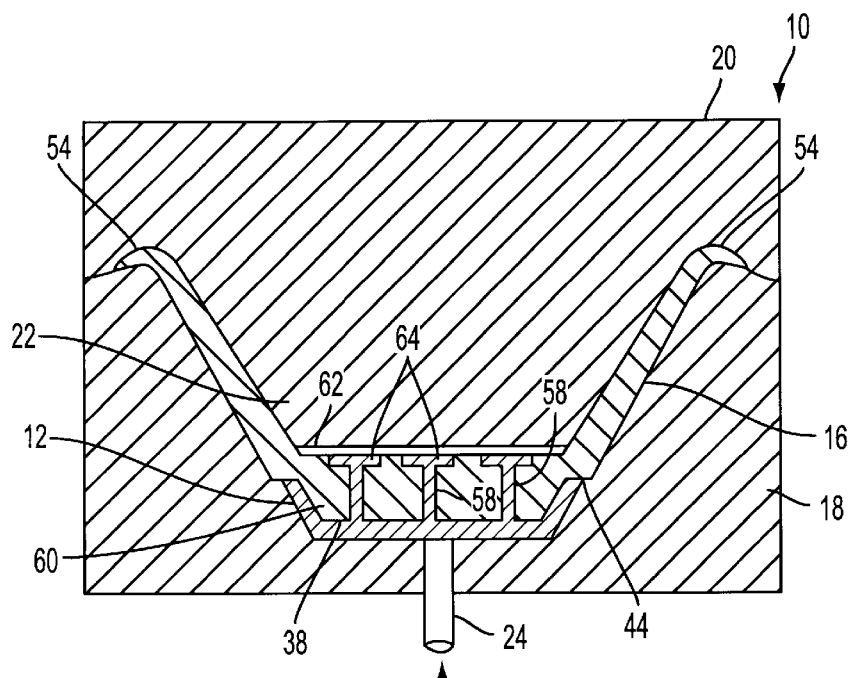
FIG. 4A is a view in section taken through the center of a mold constructed in accordance with a second embodiment of the invention.

The present invention will now be described in conjunction with the drawings beginning with FIG. 1 which shows a mold 10 for molding a plastic or rubber base 12 over the lower or bottom stepped portion 14 of a plastic bowl 16. The mold 10 includes a bottom stepped portion 18, a top portion 20 and a core 22. It is possible to form the top and bottom portions 18, 20 as a single part such as shown in FIG. 4A;

An injection feed line 24 extends through the bottom portion 18 of mold 10 to feed plastic or rubber material 26 into the generally annular cavity 28 surrounding the bottom stepped portion 14 of bowl 16. A preferred material 26 for base 12 is a thermoplastic elastomer. As the hot plastic or rubber material 26 enters cavity 28, molding gasses 30 are drawn off by vacuum line 32 which communicates with an upper portion of cavity 28. Vacuum line 32 is driven by, for example, a suction pump.

By drawing off gasses 30, a very clean, sharp and dimensionally stable base 12 can be molded around the bottom stepped portion 14 of bowl 16. A particular advantage and unexpected benefit of such gas removal is the elimination of distortion in a pair of concentric circular lips 34 molded on the bottom of base 12. By keeping lips 34 essentially coplanar without waves, bends or undulations, an effective anti-slip seal can be formed between the lips 34 and a surface on which the bowl 16 is supported. Without such gas removal, the lips 34 can be formed with distortions which prevent the formation of an effective seal between lips 34.

Figure 1:
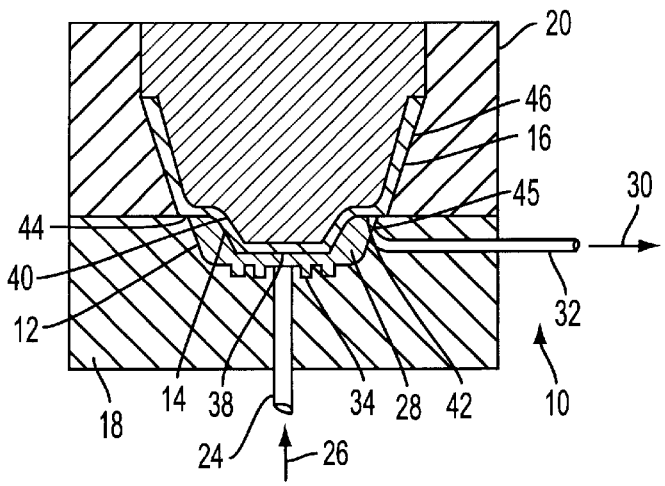
FIG. 1 is a view in section taken through the center of a mold constructed in accordance with a first embodiment of the invention.
Figure 2:
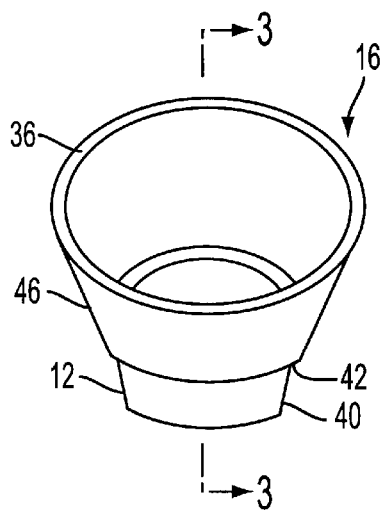
FIG. 2 is a perspective view of a bowl produced with the mold of FIG. 1.

As further seen in FIG. 1, bowl 16 flares radially outwardly from its bottom portion 14 toward its upper circular edge 36. The plastic or rubber base 12 covers the underside 38 of bottom portion 14 and extends upwardly over the inverted outwardly flaring frusto-conical side wall 40 of bottom portion 14 and terminates along the transversely, radially-outwardly extending step or ledge 42 which defines a boundary line 45 between the material of the base 12 and the upper portion 46 of bowl 16. In this embodiment, a small exposed annular overhang or ridge 44 on bowl 16 projects outwardly over base 12.

Figure 3:
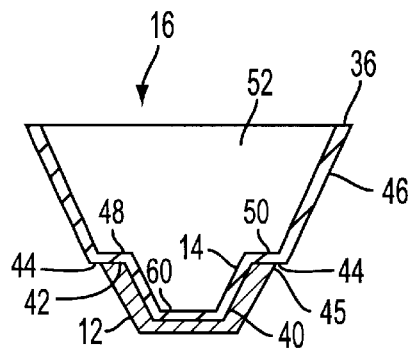
FIG. 3 is a view in section taken through line 3—3 of FIG. 2.

The radially outwardly flaring inverted frusto-conical upper side wall portion 46 of bowl 16 extends between ledge 42 and upper edge 36. As seen in FIG. 3, the upper surface 48 of ledge 42 forms an annular step 50 in the interior 52 of bowl 16.

Figure 5:
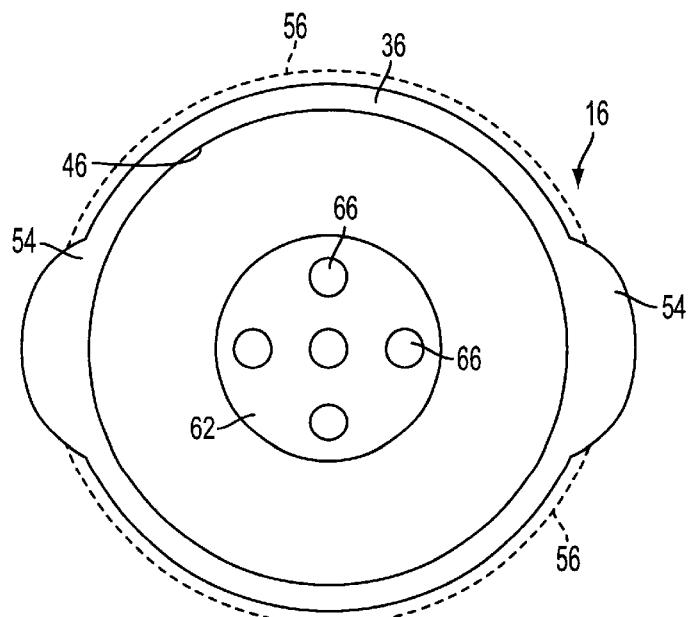
FIG. 5 is a top plan view of a bowl produced with the mold of FIG. 4A.

A second embodiment of the invention is shown in FIGS. 4A and 5 wherein a mold 10 is formed with a top portion 20 having an integral core 22 and a bottom portion 18. A pair of outwardly extending overhanging handles 54 is defined along the upper edge 36 of bowl 16. If desired, the handles 54 can continue around the entire periphery of the upper edge 36 as a smaller overhanging lip 56 as shown in dashed lines in FIG. 5.

Figure 4B:
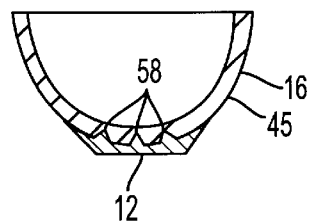
FIG. 4B is a view similar to FIG. 3 showing a variation of the bowl of FIG. 4A.

In this second embodiment, one or more vent passages 58 are initially formed through the floor 60 of bowl 16 from underside 38 to the interior surface 62 of floor 60. Recesses 64 are formed in surface 62 around the top of each vent passage 58. A variation of this embodiment is shown in FIG. 4B wherein ledge 42 and ridge 44 are eliminated, as well as recesses 64.

When the base 12 is subsequently molded around the bottom stepped portion 14 of pre-molded bowl 16, the plastic or rubber material 26 drives the molding gasses through passages 58 and into recesses 64. If desired, the recesses 64 may be formed as a decorative pattern, as images such as caricatures of pets, or as a logo, word, phrase or other design.

For illustration purposes, recesses 64 are shown in FIG. 5 as a series or pattern of five circles 66 filled with plastic or rubber material 26.

Although the bowl 16 of FIGS. 4A and 5 does not include an interior annular step such as step 50 of FIG. 3, it is of course possible to form such a step, if desired, so as to save on molding material for bowl 16. Floor 60 would then be located as seen in FIG. 3. Lips 34 may also be formed on this embodiment as well, if desired.

Figure 6:
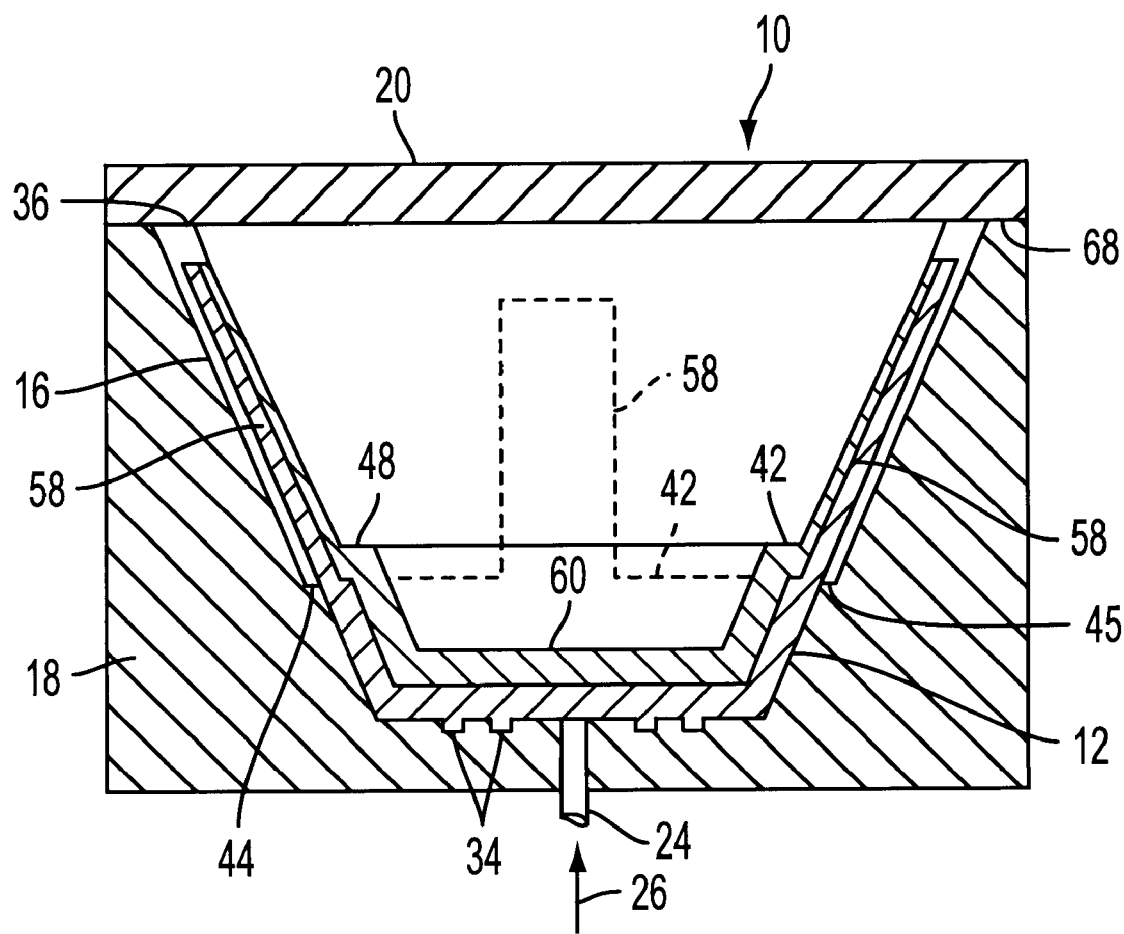
FIG. 6 is a view in section taken through the center of a mold constructed in accordance with a third embodiment of the invention.

A third embodiment of the invention is shown in FIG. 6 where one or more gas vent passages 58 are formed through the interior of the upper portion 46 of bowl 16. Vent passages extend from the underside of ledge 42 upwardly to a point below edge 36.

If desired, the vent passages 58 could extend all the way up and through edge 36 to allow gas venting through mold interface 68. In this third embodiment, the top portion of mold 10 is a simple platen without any core portion 22.

Figure 7:
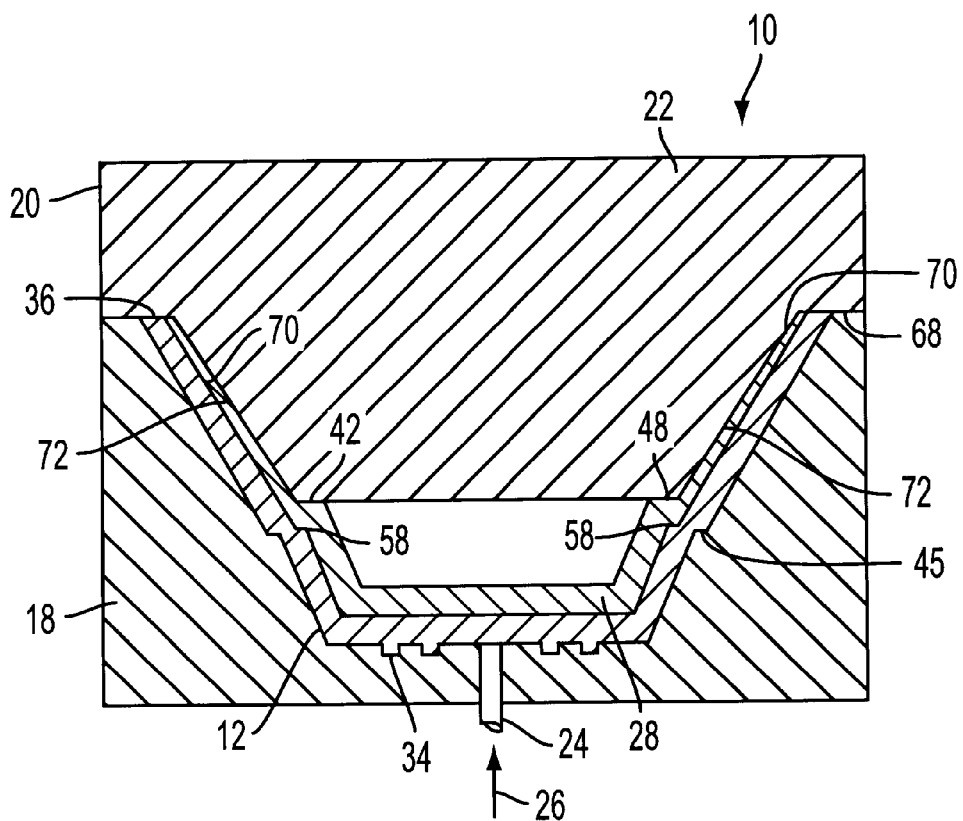
FIG. 7 is a view in section taken through the center of a mold constructed in accordance with a fourth embodiment of the invention.
Figure 8:
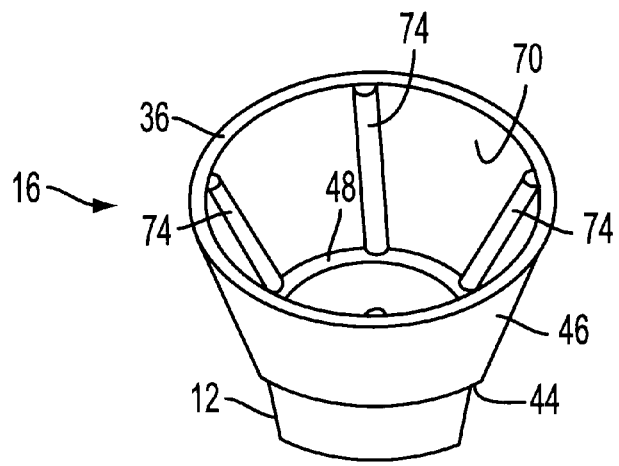
FIG. 8 is a perspective view of a bowl produced with the mold of FIG. 7.

A fourth embodiment is shown in FIGS. 7 and 8 wherein vent passages 58 are formed through ledge 42 as in the previous embodiment of FIG. 6, but rather than extending into the interior of the bowl walls between their inner and outer surfaces, these vent passages extend through the upper surface 48 of ledge 42 adjacent to the inner surface 70 of upper portion 46 of bowl 16. The vent passages 58 are formed either during or after the molding of bowl 16.

Vent passages 58 continue to extend upwardly over the inner surface 70 through grooves 72 formed in the outer surface of core 22. When the plastic or rubber material 26 is injected into cavity 28, it drives the molding gasses through vent passages 58 in ledge 42 and up and through grooves 72 and if desired, out of interface 68.

The rubber material 26 flows through grooves 72 and when cooled forms a decorative pattern of ribs 74 around the interior of the upper portion 46 of bowl 16. By venting the molding gas, the dimensional stability and accuracy of the lips 34 is greatly improved and effectiveness of the suction seal formed between the lips and a support surface is greatly improved as well.

Figure 9:
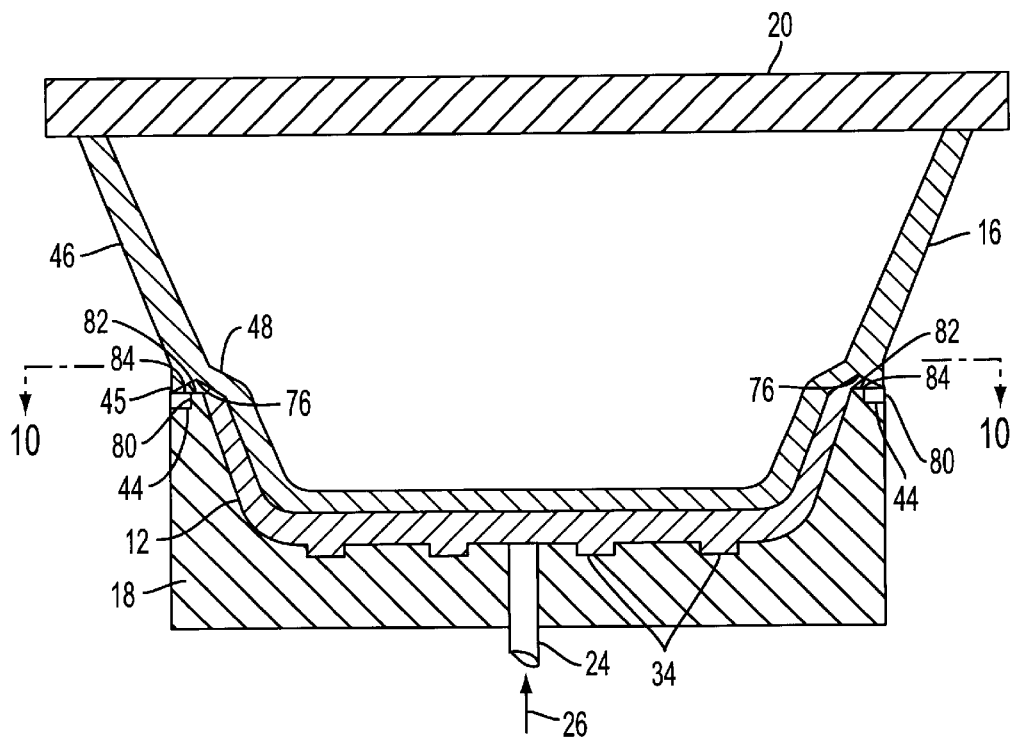
FIG. 9 is a view in section taken through the center of a mold constructed in accordance with a fifth embodiment of the invention.
Figure 10:
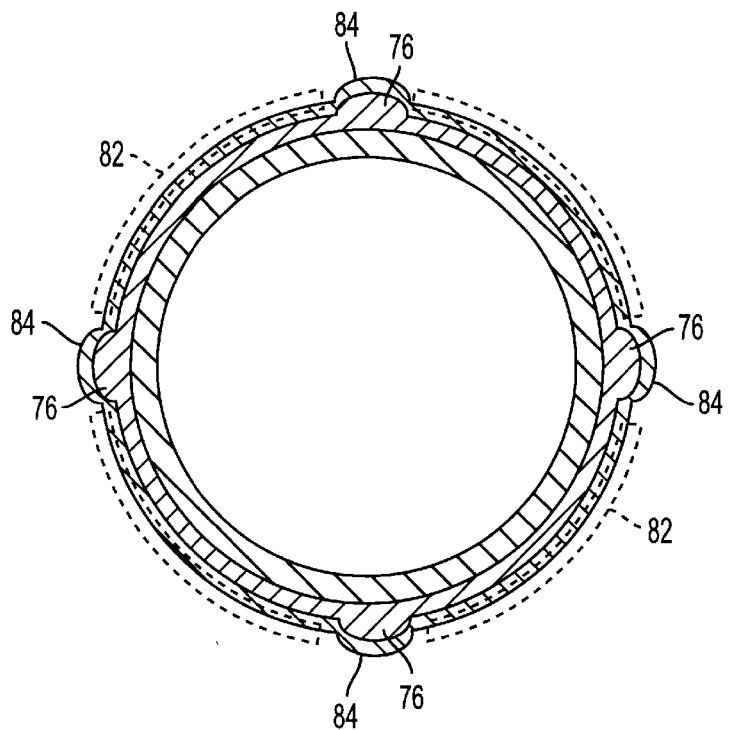
FIG. 10 is a view in section taken through line 10—10 of FIG. 9.
Figure 11:
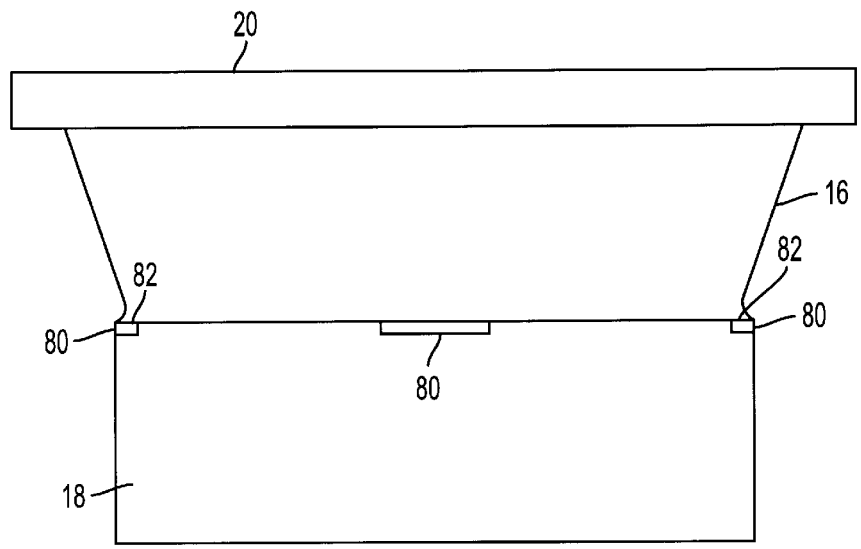
FIG. 11 is a front elevation view of the mold of FIG. 9.

A fifth embodiment is shown in FIGS. 9, 10 and 11 wherein shallow undercuts or recesses 76 are formed in the bottom surface of ledge 42. A series of vent openings 80 is formed in the upper surface 82 of the lower mold portion 18 as seen in FIGS. 9 and 11. As seen in FIG. 10 in dashed lines, the upper surface 82 supports the ridge 44 of bowl 16 in a series of four circular segments, with little or no support provided adjacent the undercuts or recesses 76.

In this embodiment, four small slightly humped or arched projections 84 are formed symmetrically around the periphery of ridge 44. The thickness of the ridge 44 is decreased adjacent each undercut 76 to allow for the venting of gas to ambient.

Figure 12:
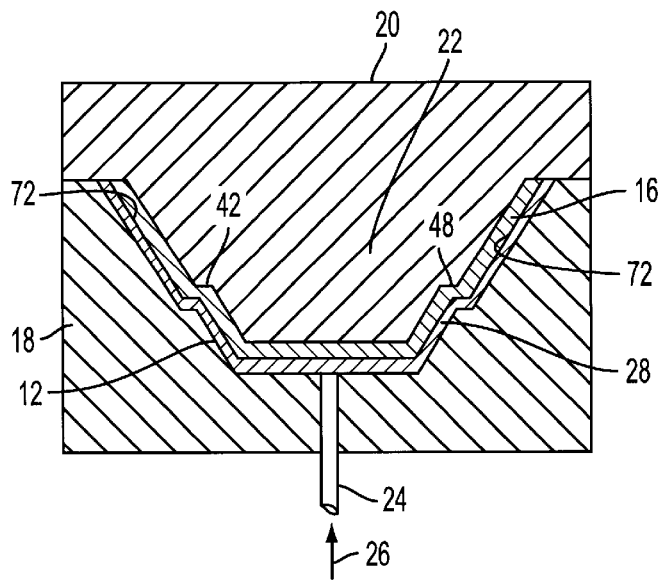
FIG. 12 is a view in section taken through the center of a mold constructed in accordance with a sixth embodiment of the invention.
Figure 13:
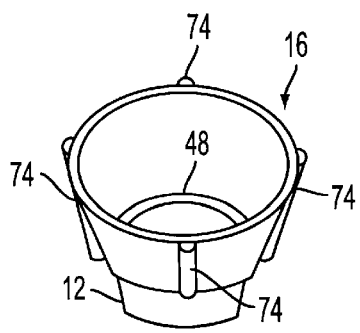
FIG. 13 is a perspective view of a bowl produced with the mold of FIG. 12.

A last embodiment is shown in FIGS. 12 and 13. This embodiment is similar to that of FIGS. 7 and 8 except that the molding material 26 does not flow through the floor 60 into the interior of the bowl 16 but rather flows in a similar pattern along the outer or exterior surface of bowl 16.

In this case, grooves 72 are formed in the interior surface of the lower mold portion 18 such as in a circumferentially-spaced array to allow material 26 to flow along the outside of the upper portion 46 of bowl 16 and thereby expel molding gasses from cavity 28. A decorative pattern of molded ribs 74 is thus formed as shown in FIG. 13. Ribs 74 also serve to strengthen and rigidify the resulting two part molded bowl.

Figure 14:
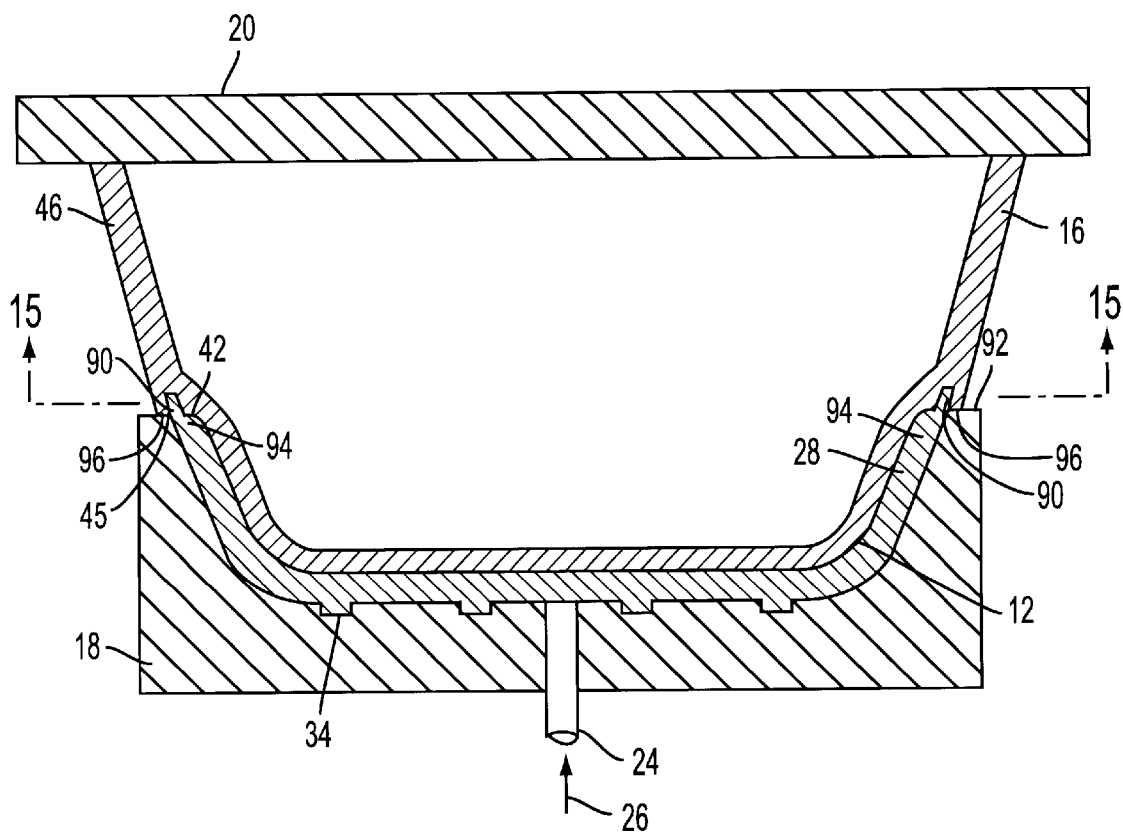
FIG. 14 is a view similar to FIG. 9 showing another embodiment of the invention.
Figure 15:
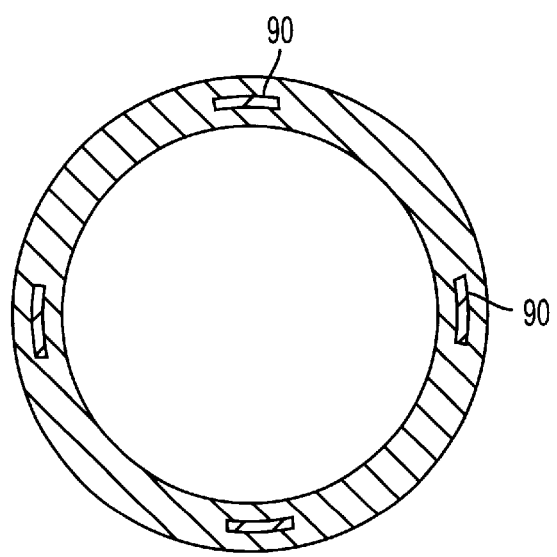
FIG. 15 is a view in section taken through section line 15—15 of FIG. 14.

Another embodiment of the invention is shown in FIGS. 14 and 15. This embodiment is similar to that of FIGS. 9, 10 and 11, except that vent openings 80 are eliminated from the mold and undercuts 90 formed in the sidewall of the bowl 16 are radially aligned in part over the top surface 92 of the bottom portion 18 of the mold and in part over the annular cavity 28 within which the base 12 is formed. The undercuts 90 form four equally spaced recesses about ⅛ inch deep within the side wall of the bowl 16.

The particular alignment of the undercuts with the mold and the cavity 28 forms a small bleed passage 94 between mold portion 18 and the outer surface of the side wall of bowl 16 adjacent ledge 42. As material 26 fills cavity 28, molding gas is forced into undercuts 90 and expelled through the interface 96 between the bowl 16 and mold portion 18.

Rubber or elastomeric material 26 eventually enters the undercuts 90, as shown. By controlling the molding pressure, the volume of the recesses or undercuts 90 serves as an overflow reservoir to receive any excess molding material 26. The undercuts are shown as four separate cavities or recesses, but could take the form of a single annular undercut or other configuration.

Figure 16:
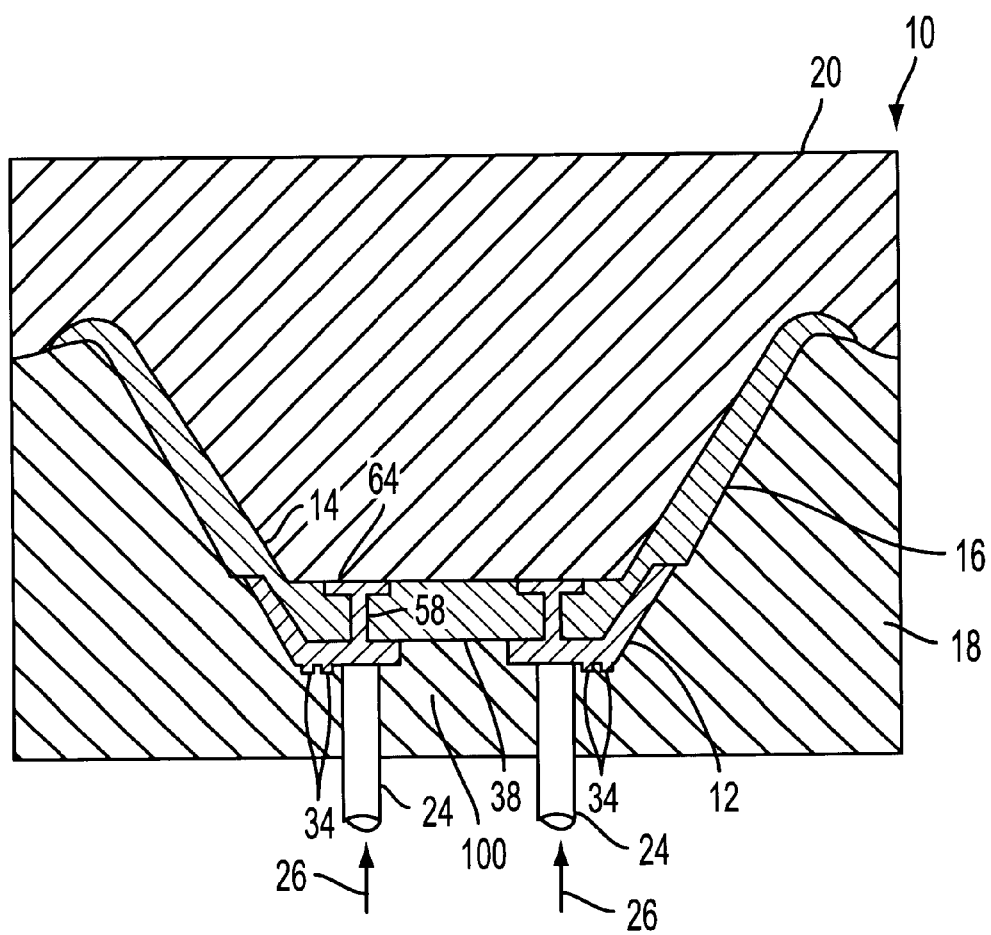
FIG. 16 is a view in section of another embodiment of the invention showing a mold similar to the mold of FIG. 4A.
Figure 17:
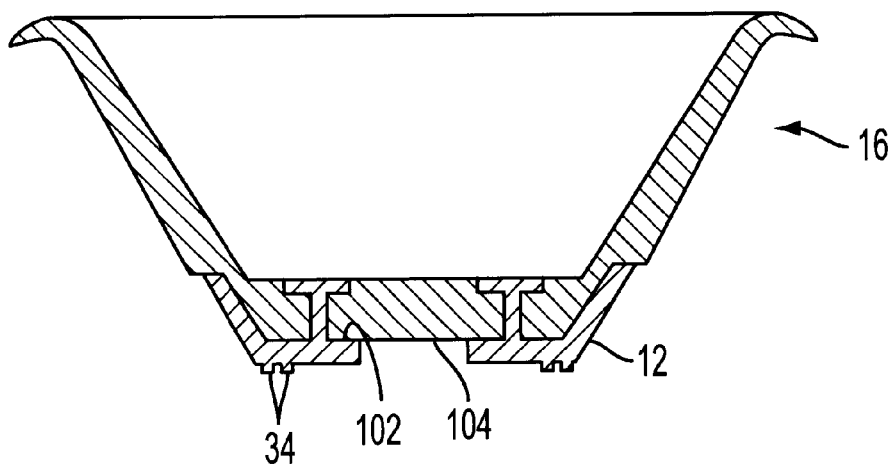
FIG. 17 is a view of a bowl produced in the mold of FIG. 16.

Another embodiment of the invention is shown in FIGS. 16 and 17 wherein the bottom portion 18 of mold 10 is formed with a circular vertical step 100 which abuts against the center of the underside 38 of the bottom portion 14 of bowl 16. The mold 10 of FIG. 4A can be easily modified to form the mold 10 of FIG. 16 and to mold the elastomeric base 12 onto bowl 16 using the same molding technique as discussed in connection with FIG. 4A. A pair of offset feed lines 24 is used in this case. Of course, other molding techniques can be used as discussed above.

As seen in FIG. 17, the resulting molded bowl 16 and high friction gripping base 12 is formed with base 12 molded to only a first portion 102 of the underside 38. A second portion 104 remains exposed and uncovered by the base 12. While FIGS. 16 and 17 disclosed a circular exposed portion 104 surrounded by an annular ring of base material, any pattern of base material can be molded on underside 38 to leave an exposed portion of the bowl. For example, the rubber of base 12 can be molded in a spoke-like pattern centered on underside 38.

Figure 18:
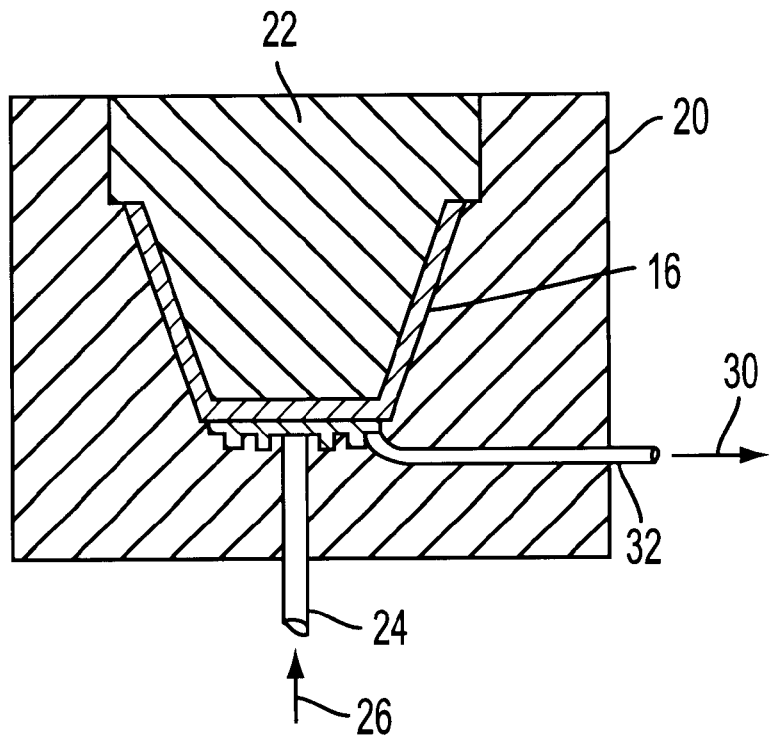
FIG. 18 is a view in section of another embodiment of the invention.
Figure 19:
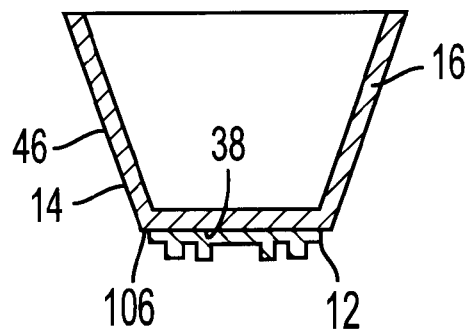
FIG. 19 is a view of a bowl produced with the mold of FIG. 18.

Another embodiment of the invention is shown in FIGS. 18 and 19 wherein base 12 is molded to bowl 16 only on a portion of underside 38. The mold of FIG. 1 can be easily modified to the form shown in FIG. 18 and the molding technique used in FIG. 1 can be readily adapted for use with the mold of FIG. 18.

As seen in FIG. 19, the resulting bowl is formed with a circular base 12 centered on underside 38. An annular exposed portion 106 of underside 38 encircles the base 12 so that no material from base 12 extends upwardly over the outer surface of bottom portion 14 or sidewall 46 of bowl 16. Again, other molding patterns can be formed on underside 38 using this molding technique.

There has been disclosed heretofore the best embodiment of the invention presently contemplated. However, it is to be understood that the various changes and modifications may be made thereto without departing from the spirit of the invention.

What is claimed is:

1. A molded bowl assembly comprising:

a molded bowl; and a base molded around a lower portion of said molded bowl;

whereas said molded bowl comprises an upper portion and a lower portion, a junction formed in-between, and wherein said molded base terminates at said junction;

said bowl further comprising a ledge formed along said junction and wherein said ledge comprises a ridge overhanging said lower portion, and a plurality of recesses spaced circumferentially about said ledge.

2. A molded bowl assembly comprising:

a molded bowl; and a base integrally molded around a lower portion of said molded bowl;

whereas said molded bowl comprises an upper portion and a lower portion, a junction formed in-between, and wherein said molded base terminates at said junction;

said bowl further comprising a ledge formed along said junction and wherein said ledge comprises a stepped transition between said upper portion and said lower portion, and at least one recess provided on said ledge, wherein said upper portion comprises an arched projection extending over said recess, and wherein said arched projection comprises a reduced material section.

3. The assembly of claim 1, further comprising a pair of handles molded on said upper portion.

4. The assembly of claims 1 or 2, wherein said upper and lower portions each flare outwardly from said lower portion toward said top portion.

5. The assembly of claims 1 or 2, wherein said base further comprises an underside and further comprising a pair of annular lips formed on said underside.

6. The assembly of claims 1 or 2, wherein one or more vent passages are formed at least partially at the junction of the upper and lower portions.

7. The assembly of claim 6, wherein said base extends into said at least one vent passage.

8. The assembly of claims 1 or 2, further comprising at least one vent passage extending within the top of the lower portion or the bottom of the upper portion of said molded bowl.

9. The assembly of claims 1 or 2, wherein said upper portion comprises an inner surface and at least one vent passage communicating with said inner surface and said base extends through said at least one vent hole and along said inner surface.

10. The assembly of claim 9 wherein said at least one vent passage comprises a plurality of vent passages and wherein said base extends through said vent passages so as to form a plurality of ribs on said inner surface.

11. The assembly of claims 1 or 2, wherein said upper portion comprises an outer surface portion and further comprising a plurality of ribs extending from said base along said outer surface and spaced symmetrically around said upper portion.

* * * * *